US012632481B1

(12) United States Patent
Bar Eliyahu et al.

(10) Patent No.: US 12,632,481 B1
(45) Date of Patent: May 19, 2026

(54) COMBINING VECTOR SEARCH AND LLMS FOR ENTITY MATCHING ON LARGE SCALE

(71) Applicant: Intuit Inc., Mountain View, CA (US)

(72) Inventors: Natalie Bar Eliyahu, Azor (IL); Shon Mendelson, Tel Aviv (IL); Shahar Keren, Haifa (IL); Sigalit Bechler, Bney Zion (IL); Eduard Zlotnik, Rosh HaAyin (IL); Noa Haas, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/195,610

(22) Filed: Apr. 30, 2025

(51) Int. Cl.
*G06F 16/334* (2025.01)
*G06F 16/3329* (2025.01)
*G06F 16/338* (2019.01)

(52) U.S. Cl.
CPC ........ *G06F 16/334* (2019.01); *G06F 16/3329* (2019.01); *G06F 16/338* (2019.01)

(58) Field of Classification Search
CPC ................................................... G06F 16/334
See application file for complete search history.

(56) References Cited

U.S. PATENT DOCUMENTS

| | | | |
|---|---|---|---|
| 2015/0172419 A1* | 6/2015 | Toledo ..................... | H04W 4/16 |
| | | | 709/203 |
| 2018/0198740 A1* | 7/2018 | Rademacher ........... | H04L 51/04 |
| 2021/0029131 A1* | 1/2021 | Mertens ................ | H04L 63/102 |
| 2025/0013682 A1* | 1/2025 | Wang ..................... | G06N 7/023 |

* cited by examiner

*Primary Examiner* — Van H Oberly
(74) *Attorney, Agent, or Firm* — Dinsmore & Shohl LLP

(57) ABSTRACT

Certain aspects provide a method including: receiving a user request from a first user to create a local contact for an entity; providing the user request to a first language model configured to access to a database of network contacts; receiving a list of candidate entities from the first language model; and in response to determining that a similarity score for at least one candidate entity falls between a minimum similarity score threshold and a maximum similarity score threshold, providing the user request, the list of candidate entities, and the prompt to a second language model; receiving a response from the second language model comprising a predicted entity; and generating for display a user recommendation to replace the local contact of the entity indicated in the user request with a network contact corresponding to the predicted entity.

20 Claims, 6 Drawing Sheets

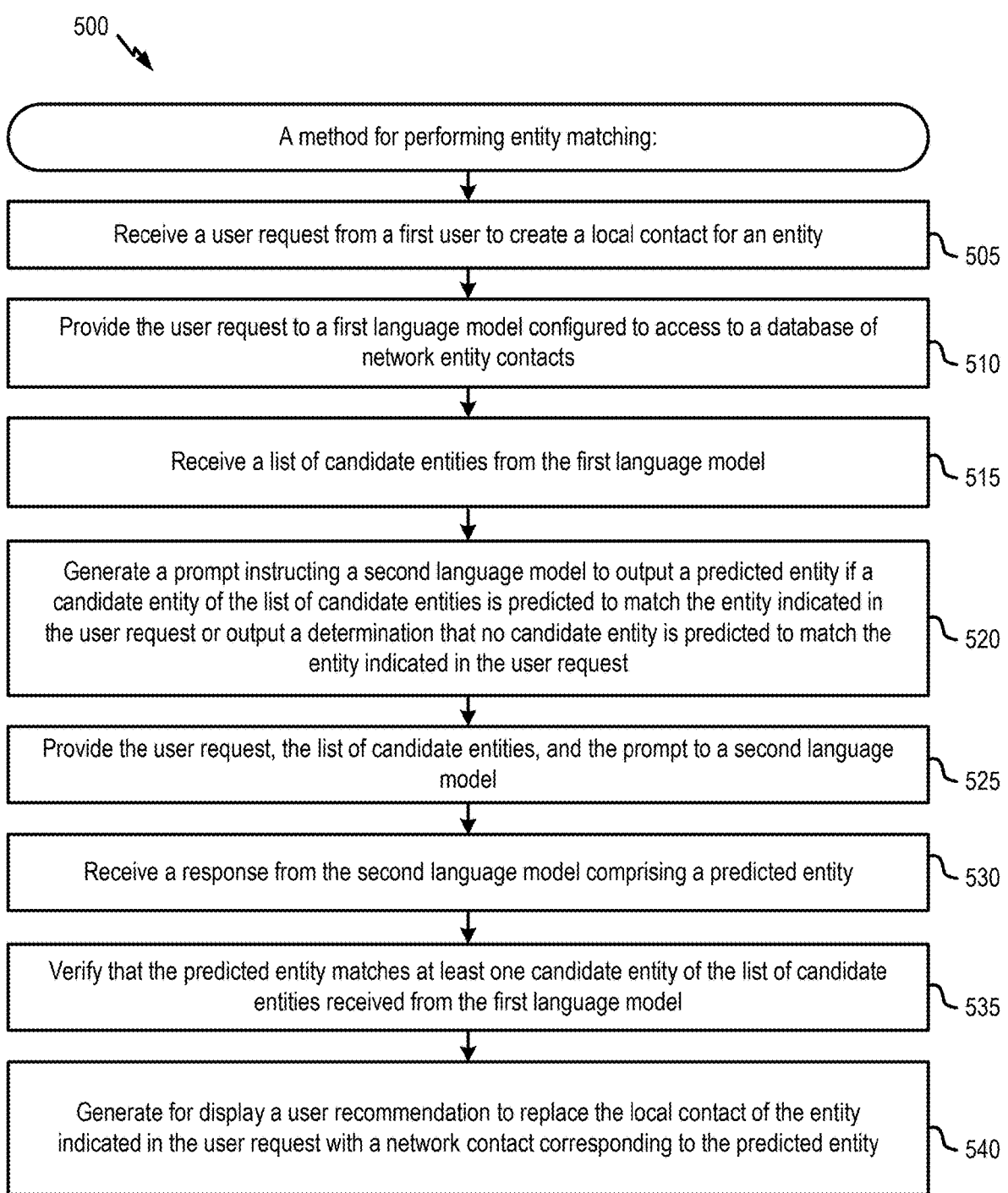

500

A method for performing entity matching:

Receive a user request from a first user to create a local contact for an entity — 505

Provide the user request to a first language model configured to access to a database of network entity contacts — 510

Receive a list of candidate entities from the first language model — 515

Generate a prompt instructing a second language model to output a predicted entity if a candidate entity of the list of candidate entities is predicted to match the entity indicated in the user request or output a determination that no candidate entity is predicted to match the entity indicated in the user request — 520

Provide the user request, the list of candidate entities, and the prompt to a second language model — 525

Receive a response from the second language model comprising a predicted entity — 530

Verify that the predicted entity matches at least one candidate entity of the list of candidate entities received from the first language model — 535

Generate for display a user recommendation to replace the local contact of the entity indicated in the user request with a network contact corresponding to the predicted entity — 540

*FIG. 5*

COMBINING VECTOR SEARCH AND LLMS FOR ENTITY MATCHING ON LARGE SCALE

BACKGROUND

Field

Aspects of the present disclosure relate to generative artificial intelligence.

Description of Related Art

Generative artificial intelligence (GenAI) refers to machine learning models that are able to create new content based on patterns and information learned from training data in combination with a user prompt. The user prompt provides instructions to the model on what new content to generate and how to generate that new content. Notably, the model is able to generate new content based on both the actual information (e.g., facts and knowledge) included in the training data, as well as patterns, insights, and model parameter weights learned from the training data.

GenAI models are able to generate new content in many different forms, including text, image, audio, and even video. For example, to facilitate text generation, some GenAI models are configured as language models (LMs). An LM is generally a type of machine learning model that is designed to understand, generate, and manipulate human language. More specifically, an LM is a probabilistic framework that determines the likelihood of a sequence of words or tokens. At its core, an LM attempts to predict the probability of the next word in a sentence given the preceding words. The model estimates these probabilities based on the patterns it learned during training. LMs are useful in natural language processing (NLP) and computational linguistics for performing a range of tasks involving human language.

LMs have a wide array of applications, including: text generation (e.g., producing coherent and contextually appropriate text); machine translation (e.g., converting text from one language to another); speech recognition (e.g., converting spoken language into text); text summarization (e.g., condensing a long piece of text into a shorter summary); sentiment analysis (e.g., determining the sentiment expressed in a piece of text); and question answering (e.g., automatically providing answers to questions posed in natural language).

SUMMARY

Certain aspects provide a method including: receiving a user request from a first user to create a local contact for an entity; providing the user request to a first language model configured to access to a database of network contacts; receiving a list of candidate entities from the first language model, the list of candidate entities comprising one or more network contacts from the database of network contacts that are predicted to match the entity indicated in the user request and a corresponding similarity score for each respective candidate entity in the list of candidate entities, wherein the corresponding similarity score represents a similarity between the entity indicated in the user request and a respective candidate entity; and in response to determining that a similarity score for at least one candidate entity falls between a minimum similarity score threshold and a maximum similarity score threshold: generating a prompt instructing a second language model to output a predicted entity if a candidate entity of the list of candidate entities is predicted to match the entity indicated in the user request or output a determination that no candidate entity is predicted to match the entity indicated in the user request; providing the user request, the list of candidate entities, and the prompt to a second language model; receiving a response from the second language model comprising a predicted entity; verifying that the predicted entity matches at least one candidate entity of the list of candidate entities received from the first language model; and generating for display a user recommendation to replace the local contact of the entity indicated in the user request with a network contact corresponding to the predicted entity.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 5 depicts an example process flowchart associated with a method for performing combined vector search and entity matching.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
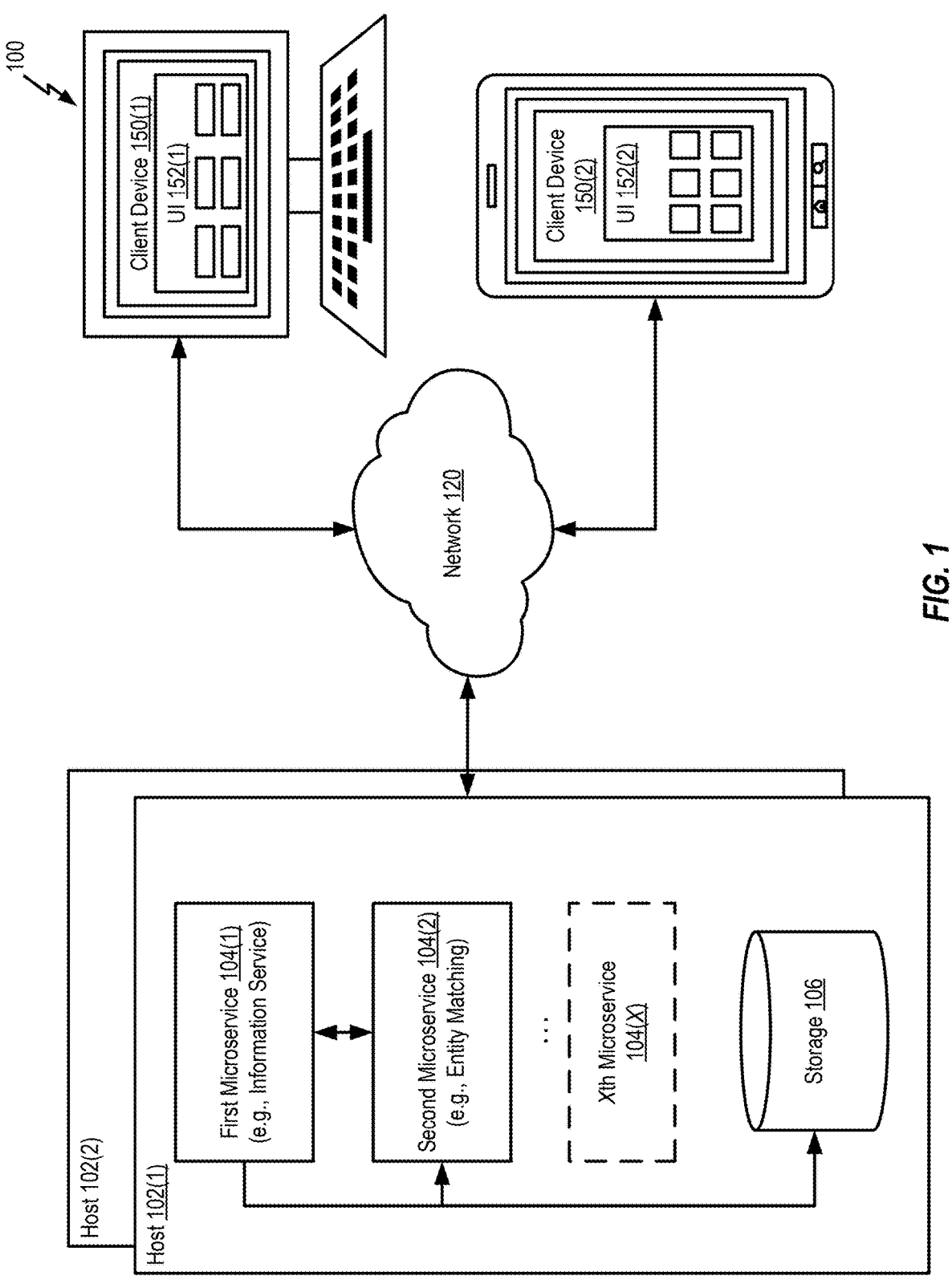
FIG. 1 depicts an example computing environment.

As described above, an LM is a type of machine learning model that is designed to understand, generate, and manipulate human language by predicting the next token in a token sequence based on previously predicted tokens. LMs may be characterized by various components and capabilities. For example, an LM may include a vocabulary that defines the set of all possible words or tokens that the model can recognize and use. This includes common words, punctuation, and possibly domain-specific jargon. LMs may also consider a context, which refers to the preceding words in a sentence or sequence that the model uses to predict the next word.

In addition to text generation, machine translation, speech recognition, text summarization, and other applications mentioned above, LMs can also be used to encode data, perform vector searching, and entity matching. LMs facilitate entity matching by first transforming entities into vector representations, or embeddings, which capture semantic meaning while being mapped to a high-dimensional space. Similar entities are mapped close together, while dissimilar entities are mapped further away from each other in the high dimensional space. These embeddings are then compared using various similarity metrics, such as cosine similarity, Euclidean distance, or dot products to quantify the relationship between entities. LMs can also be configured to generate similarity scores of predicted matches, with higher similarity scores indicating greater semantic similarity. LMs produce meaningful matches even when there are variations in naming conventions, abbreviations, formatting inconsistencies, and typographical errors. These types of variations cause matching failure in exact entity matching techniques, even when a meaningful match might exist but cannot be determined because it is not an exact match. Thus, LM-based entity matching overcomes many technical problems associated with exact-entity matching.

Notably, LMs are sometimes distinguished as between a "large" LM (LLM) and a "small" LM (SLM) based on the size and complexity of the model, which affects their capabilities and applications. LLMs are often characterized by their large number of parameters, ranging from hundreds of millions to trillions of parameters. The extensive scale of LLMs enables them to capture complex language patterns and nuances. Due to their size and comprehensive training, LLMs exhibit excellent language understanding and generation abilities. However, while LLMs have robust capabilities, LLMs require significant computational resources for both training and fine-tuning because of both the amount of data required for training, as well as the extensive scale of the underlying model parameters that must be updated during the training or fine-tuning process. These computational resources include, for example, powerful processing hardware such as multiple GPUs or TPUs and substantial memory and storage capacity. This can be a substantial technical problem when deploying LLMs to perform high-volume tasks across wide-spread deployments, where the computational drain on resources may be prohibitive and not cost-effective.

In contrast, SLMs typically contain fewer parameters than LLMs, generally ranging from a few million to several hundred million parameters. This reduced parameter count allows SLMs to be more computationally efficient and less resource intensive than LLMs. Beneficially, SLMs can be deployed on devices with limited computational capabilities, such as mobile phones, edge devices, or standard servers without specialized hardware acceleration. Thus, SLMs offer faster inference times, lower deployment costs, and reduced energy consumption, but with the tradeoff of reduced capabilities in complex generation tasks. Instead, SLMs excel in specialized or focused tasks, such as generating semantic entity embeddings, performing vector search operations, and computing semantic similarity between entity pairs. However, in some instances, SLMs capabilities may not be sufficient to produce meaningful entity matches, or predict a best match, when attempting to perform entity matching involving complex entity relationships, rare entity types that appear infrequently in training data, or inconsistent formatting or data availability associated with the entities being matched.

Accordingly, systems and methods for performing entity matching are described herein that provide technical solutions and benefits over existing systems for entity matching. In particular, aspects of the disclosed systems and methods are directed to entity matching systems that are configured to perform vector search and entity matching using a combination of SLMs and LLMs. The disclosed aspects beneficially utilize an SLM to generate embeddings, perform a vector search, and generate similarity scores to determine one or more entity matches. If the SLM has a high confidence level associated with the matches it produces, such as exceeding a maximum similarity score threshold, or a high confidence level associated with predicting that no matches exist, such as not meeting a minimum similarity score threshold, then no further processing is needed to provide the user with meaningful and accurate entity matching results. If the SLM has a low confidence associated with the entity matches it was able to predict, such as determining that one or more similarity scores fall between the minimum similarity score threshold and maximum similarity score threshold, then the system is able to selectively engage an LLM for performing the entity matching to supplement the results produced by the SLM.

In order to mitigate the high computational resource usage associated with utilizing an LLM, the LLM used in the disclosed entity matching system leverages a list of candidate entities from a vector search algorithm, which presents top potential matches in the list of candidate entities. The LLM is also prompted to identify a match of high confidence in a single query. By utilizing this hybrid approach, the entity matching system is able to leverage the efficiencies and capabilities of SLMs and LLMs for entity matching without degradation to entity matching results or incurring prohibitive amounts of computational resources. Overall, the selective integration of SLMs and LLMs in the disclosed entity matching systems herein beneficially provides a balance between efficiency provided by SLMs and enhanced performance provided by LLMs to improve the accuracy and meaningfulness of predicted entity matches.

One example of a practical application for utilizing the disclosed entity matching systems is in the case of contact management. For instance, a first user on a software platform could also be registered as a user of another software platform or as a secondary user associated with another software platform user. For example, a user may have a Mailchimp® account, as well as a Quickbooks® account. In some instances, it is desirable to link those accounts based on both accounts corresponding to the same user.

The first user may use differing details while registering as the secondary user even though they are the same user. These types of discrepancies may make it hard for the currently available entity matching systems to identify that two user registries are actually the same user. Furthermore, the high volume of data complicates this task in software platforms that manage millions of users, making it impractical to identify matching user registries on a one-to-one basis. Accordingly, by employing entity matching systems as described herein, the combination of utilizing SLMs and LLMs can help to provide improved contact management by identifying matching user registries quickly, accurately, and efficiently.

Entity Matching Systems

FIG. 1 depicts an example system 100 supporting a plurality of microservices 104 (e.g., software-defined services, which in some cases, may be cloud-native). As shown in FIG. 1, system 100 includes client devices 150(1)-(2) (collectively referred to herein as "client devices 150") and hosts 102(1)-(2) (collectively referred to herein as "hosts 102") interconnected through a network 120. Network 120 may be, for example, a direct link, a local area network (LAN), a wide area network (WAN), such as the Internet, another type of network, or a combination of one or more of these networks.

Host 102 may be geographically co-located servers on the same rack or on different racks in any arbitrary location in a data center. Host 102 may be constructed on a server grade hardware platform and include components of a computing device such as, one or more processors (central processing units (CPUs)), one or more memories (random access memory (RAM)), one or more network interfaces (e.g., physical network interfaces (PNICs)), storage 106, and other components (e.g., only storage 106 is shown in FIG. 1).

A first host 102(1) in system 100 may host a plurality of microservices 104(1)-(X) (collectively referred to herein as "microservices 104"), where X is an integer greater than one. The microservices 104 may be deployed using virtual machines (VMs) and/or container(s) running on first host 102(1) (e.g., where first host 102(1) is running a hypervisor (not shown) used to abstract processor, memory, storage, and networking resources of first host 102(1)'s hardware platform). Generally, microservices 104 are loosely coupled and independently deployable services (or software) that may make up an application. Microservices 104 may enable segmented, granular level functionalities within a larger system infrastructure.

Client device 150(1) and client device 150(2) may each include a user interface (UI) 152(1), 152(2), respectively, which may be used to communicate with, at least, a first microservice 104(1) and/or another microservice 104, through the X-th microservice 104(X) using the network 120. For example, communication between client devices 150 and a microservice 104 may be facilitated by one or more application programming interfaces (APIs). Examples of client devices 150 may include a smartphone, a personal computer, a tablet, a laptop computer, and/or other devices.

As shown in FIG. 1, in certain aspects, the first microservice 104(1) implements an information service, which is any network 120 accessible service that maintains financial data (e.g., such as information about invoices, payments, etc.), medical data, personal identification data, and/or other data types. For example, the information service may include QuickBooks®. In certain aspects, the information service stores its data in storage 106. In some aspects, the information service is configured as a contact management system, in which users are able to manage a plurality of local and network contacts associated with different entities with which the users engage in business communications.

In certain aspects, the second microservice 104(2) implements an entity matching service. The entity matching service may be a service used to identify matches between entities associated with the information service. In certain aspects, the entity matching service may use one or more techniques (e.g., such as techniques for encoding, vector searching, similarity scoring, and entity matching described herein) to efficiently and accurately identify entity matches, thereby reducing the time and/or resources necessary to manage the entities associated with the information service.

Further, in certain aspects, the entity matching service may help to solve an entity matching problem associated with data from the information service (e.g., the first microservice 104(1) stored in storage 106. As an illustrative example, the information service may store contact information for a user in storage 106. The entity matching service may be used to identify contacts managed by one user that match contacts managed by another user, as described herein. In certain aspects, the information service may use the entity matches to improve recordkeeping, help manage contacts, and/or reduce memory associated with storing redundant contacts, among other tasks.

Though FIG. 1 depicts each of first host 102(1), storage 106, client device 150(1), and client device 150(2) as single devices for ease of illustration, first host 102(1), storage 106, client device 150(1), and/or client device 150(2) may be embodied in different forms for different implementations. Further, though FIG. 1 depicts only two hosts 102 and two client devices 150, other examples may include more or fewer hosts 102 and/or client devices 150, and client devices 150 may use any combination of microservices 104 on any host 102 where microservices 104 are deployed.

Notably, while the entity matching techniques herein are described with respect to integration with an information service, such as a contact management system, aspects of the entity matching techniques may be applied to any entity matching scenario to achieve the same technical benefits, including improving resource management, including time and compute, and improving the accuracy of predicted entities during an entity matching scenario.

Contact Management Systems

Figure 2:
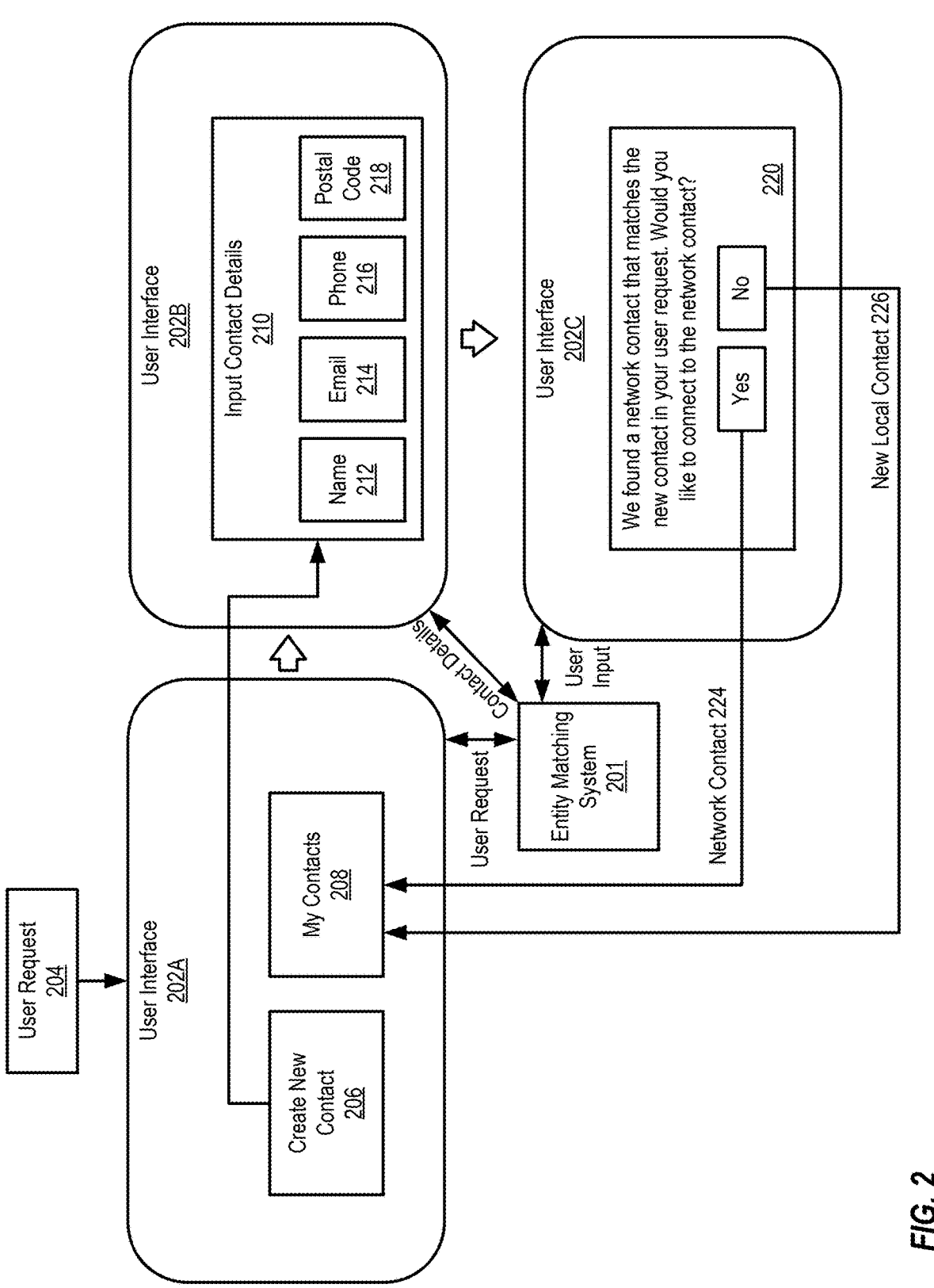
FIG. 2 depicts an example process flowchart including various user interfaces that can be used to manage user contacts.
Figure 3:
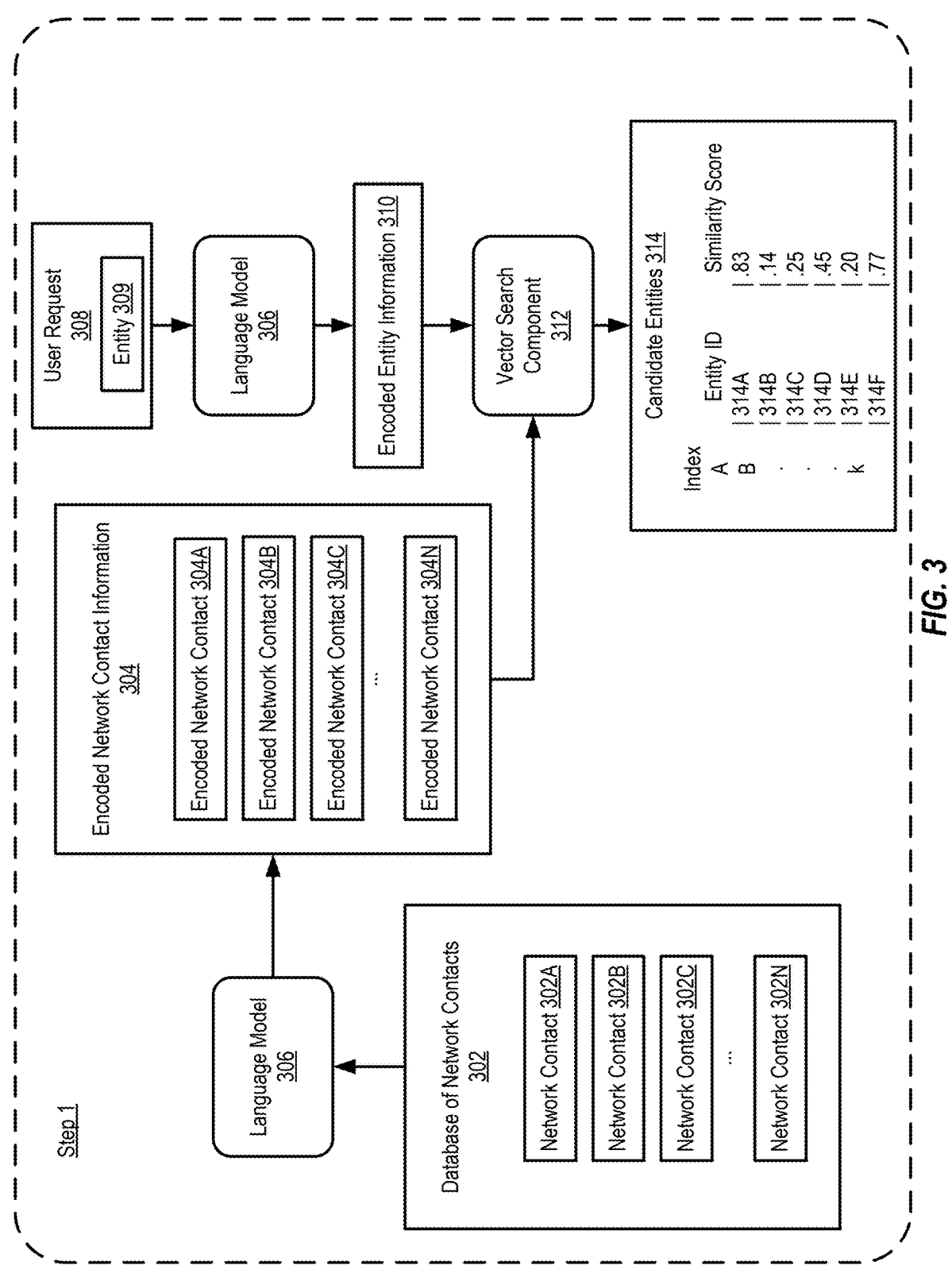
FIG. 3 depicts an example process flowchart for performing a vector search.
Figure 4:
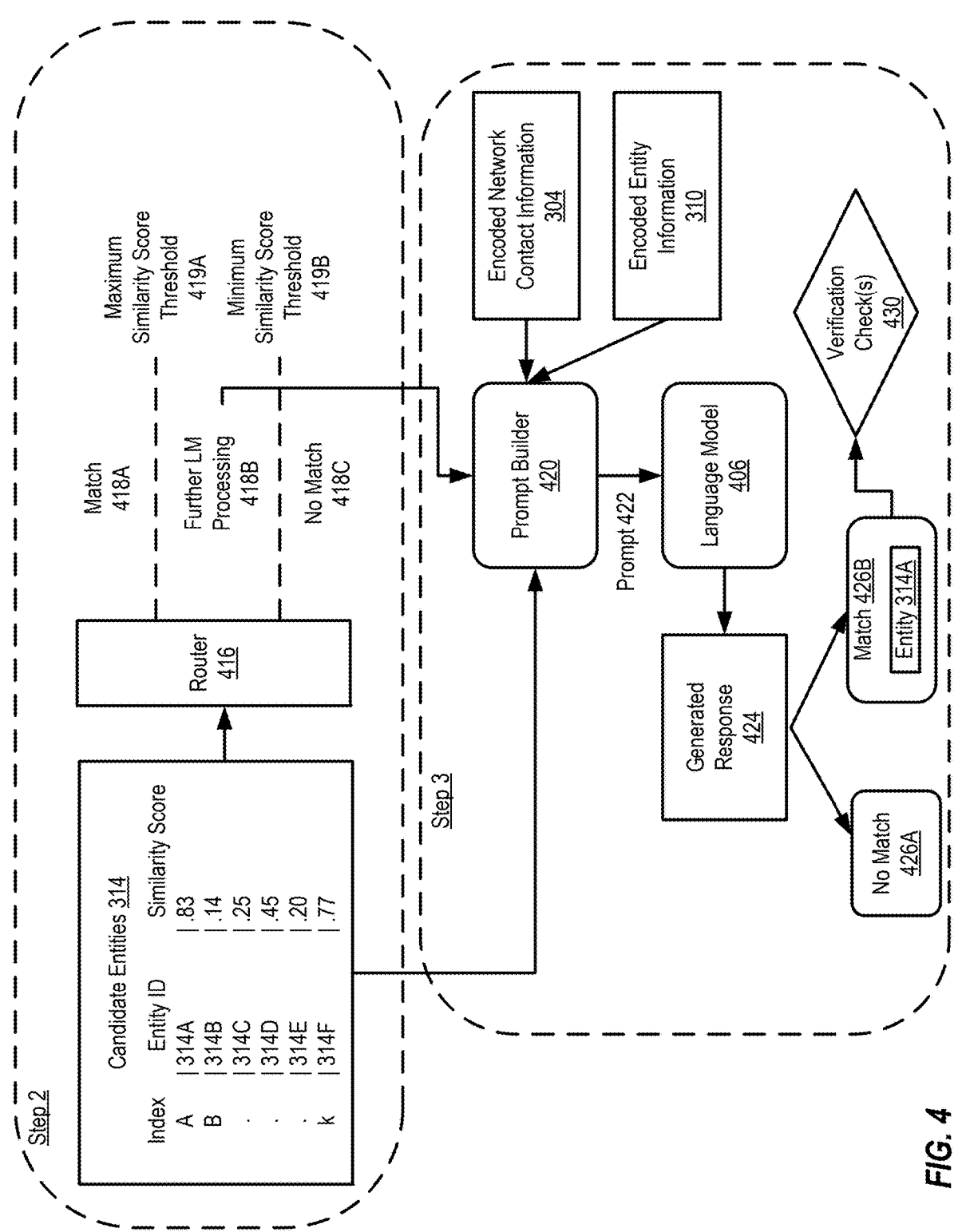
FIG. 4 depicts an example process flowchart for performing combined vector search and entity matching.

FIG. 2 depicts an example process flowchart including various user interfaces associated with entity matching system 20, described in more detail in FIGS. 3-4. In some aspects, entity matching system 201 is configured as part of a contact management system for managing user contacts within a user's contact database. When entity matching system 201 is configured as part of a contact management system, through the various interfaces, a user is able to access the user's contact database, create a new contact, update a contact, and/or connect to another contact within the system. The various user interfaces are configured to be displayed by a display device, such as client device 150(1) of FIG. 1, and to receive user input, wherein entity matching system 201 can then trigger subsequent user interfaces and/or dynamically update user interfaces based on the received user input and cause the subsequent and/or updated user interfaces to be displayed at the display device.

As shown, user interface 202A comprises a plurality of user-selectable options, including user-selectable option 206 to create a new contact or user-selectable option 208 to access the user's "My Contacts" database. The user's "My Contacts" database comprises one or more contacts associated with the user. Each contact corresponds to a particular entity and includes various contact details, including name, email address, phone number, mailing address, and/or other information about the entity. In some aspects, the entity may be a business or an individual person. These contacts include contacts that the user has created as local contacts and/or network contacts with which the user has been connected. A local contact is a contact that is only accessible to the user and can be managed by the user, while a network contact is a contact that is accessible to any users that are connected to the network but is managed only by the network contact owner who created the network contact. Some examples of managing a contact, whether local or network, include creating a contact, updating a contact with new or additional contact details, managing a contact's connections, and/or deletion of a contact.

User request 204 is generated by a user and provided to user interface 202A, for example, by selecting one of the user-selectable options displayed through user interface 202A. User request 204 comprises a request to generate a new local contact for an entity, such as a business or individual person. When the user selects user-selectable option 206 to create a new contact for the entity, the display device is updated to display user interface 202B comprising a plurality of user-selectable options associated with inputting contact details for the new contact to be created for the entity. For example, user interface 202B is configured to display a window 210 for the user to input contact details associated with the entity using the plurality of user-selectable options, such as user-selectable option 212 for providing a contact name, user-selectable option 214 for providing a contact email address, user-selectable option 216 for providing a contact phone number, and user-selectable option 218 for providing a contact postal code. One or more additional or different user-selectable options may be presented to the user to input various other contact details, such as a contact mailing address, a list of representative individuals for a business entity, contact interaction notes, and other contact details.

After entity matching system 201 receives the contact details through user interface 202B, entity matching system 201 searches through existing network contacts to determine if the new contact being created by the user matches any of the existing network contacts. For example, the new local contact being created by the user may correspond to another user who has created their own network contact. Thus, in some instances, local contacts may be associated with entities who do not have corresponding user accounts in entity matching system 201, while network contacts may be associated with entities who do have corresponding user accounts in entity matching system 201. In the case where a local contact may actually correspond to an existing network contact, the user may wish to replace or utilize the network contact instead of the local contact for a particular entity. This searching and matching process is implemented by entity matching system 201 through a combination of vector searching, described in more detail in FIG. 3, and entity matching, described in more detail in FIG. 4.

If entity matching system 201 predicts that there is a match between the new local contact being created and an existing network contact, user interface 202C displays a prompt window comprising a notification that entity matching system 201 found a network contact that matches the new contact in the user request and prompts the user to connect to the network contact. Window 220 also comprises a plurality of user-selectable options, such as "Yes" or "No" to indicate to entity matching system 201 whether the user would like to connect to the network contact ("Yes") or create the new local contact without connecting to the network contact ("No").

If entity matching system 201 receives user input indicating that the user would like to connect to the network contact, the new local contact that is being created in the user's contact database will be replaced with the network contact 224. In some instances, entity matching system 201 is configured to cause the matching network contact, including any contact details in the network contact, to be displayed to the user. In this manner, the user is able to review the network contact and its contact details to determine if the new local contact being created does in fact match the network contact. If the user does not wish to connect to the network contact, for example, if the network contact does not match the new local contact or for another reason, entity matching system 201 is configured to store the new local contact 226 in the user's contact database.

FIG. 3 depicts an example process flowchart for performing a vector search. In particular, the entity matching system, such as entity matching system 201 of FIG. 2, comprises a language model 306 and vector search component 312 to facilitate a vector search.

Initially, the entity matching system provides the database of network contacts 302 to language model 306, which is configured to generate embeddings of each network contact in the database of network contacts 302. As shown in FIG. 3, a database of network contacts 302 comprises network contact 302A, network contact 302B, network contact 302C, up through any number of network contacts, such as network contact 302N. Language model 306 processes the database of network contacts 302 and generates encoded network contact information 304, which comprises a plurality of embeddings, such as encoded network contact 304A corresponding to network contact 302A, encoded network contact 304B corresponding to network contact 302B, encoded network contact 304C corresponding to network contact 302C, and so on through encoded network contact 304N.

Beneficially, once the database of network contacts 302 is encoded, only newly added network contacts will need to undergo the encoding process for new user requests. In this manner, the entire database of network contacts 302 does not have to be encoded every time a new user request is received. This saves processing time and computational resources, such as compute and processing memory.

As shown in FIG. 3, the entity matching system receives user request 308 to create a local contact for entity 309. The user request 308 is provided to language model 306 which is fine-tuned to encode any provided inputs and generate corresponding encoded outputs. In some aspects, language model 306 is trained through a Siamese network strategy, incorporating information from both network contacts and user queries by merging data fields, such as name, email, phone number, and postal code. In order to facilitate the fine-tuning, each set of contact and/or user query information is serialized into a single string, as part of the training data. Beneficially, the training data for the fine-tuning process includes both positive and negative examples of matches in order to facilitate the embedding process. This fine-tuning is configured to bring embeddings of matching entities closer together while distancing embeddings of non-matching entities.

In particular, language model 306 receives user request 308 and generates a corresponding encoded output comprising encoded entity information 310 associated with entity 309. In some aspects, the one or more contact details associated with entity 309 are provided to the language model 306, such that the encoded entity information 310 also represents the contact details associated with entity 309. In some aspects, language model 306 is configured as an SLM, so that the encoding, vector search, and similarity scoring process utilizes reduced computational resources and incurs reduced latency within the entity matching system. By configuring language model 306 as a SLM, language model 306 is able to capture deep contextual nuances, adapt to various domains, and generalize across diverse linguistic tasks. In some aspects, language model 306 is replaced with an encoder component, for example, when language model 306 is processing data from a single domain or limited linguistic tasks, that is configured to encode the entity information from the database of network contacts 302 and/or the entity information for entity 309 indicated in user request 308.

Next, the encoded entity information 310 and encoded network contact information 304 are provided to vector search component 312. Vector search component 312 performs similarity searches between encoded inputs, such as between encoded entity information 310 and encoded network contact information 304 to identify which network contacts are similar to entity 309. When comparing two encoded inputs, vector search component 312 measures the distance between the encoded inputs using one or more techniques, including cosine similarity, Euclidean distance, dot product, and/or Manhattan distance. The distance between encoded inputs represents a similarity between the encoded inputs, where a longer distance between two encoded inputs means that the two encoded inputs are less similar than a different pair of encoded inputs that has a shorter distance between the encoded inputs. In some aspects, vector search component 312 is configured to generate a similarity score for each network contact included in the encoded network contact information 304 that represents the similarity between each respective encoded network contact.

By performing vector searching in this manner, the entity matching system achieves improved semantic searching compared to conventional exact keyword matching techniques. This is because vector search component 312 can identify matches based on similar meanings instead of exact character matches based on similar entities being proximate in the vector space. Thus, vector search component 312 is able to identify candidate entities from the database of network contacts that match entity 309, even if one or more of the contact details corresponding to entity 309 are not exact matches to contact details included in the network contacts. This may arise if contact details are misspelled, capitalized, abbreviated, or include other anomalies, whether intended or accidental, as part of the stored network contact or provided entity and corresponding entity contact details in the user request.

Routing Scheme

FIG. 4 depicts an example process flowchart for performing entity matching. The entity matching system is configured to predict which entity from the list of candidate entities best matches the entity indicated in the user request. Beneficially, the entity matching system implements an efficient routing mechanism to manage computing resources efficiently and to optimize the time it takes to output a predicted entity from the list of candidate entities. For example, in some instances, the entity matching system may be able to quickly identify a predicted entity that best matches the entity in the user request for the new local contact or may be able to quickly identify that none of the candidate entities of the list of candidate entities matches the entity in the user request. In such instances, the contact management entity does not need to further process the list of candidate entities in order to provide an output to the user, thereby saving resources. However, in some instances, the entity matching system may identify one or more candidate entities that may match the entity in the user request, but may need to perform further analysis and processing in order to provide an output to the user comprising a predicted entity or a notification that no match was found.

As shown in FIG. 4, after the entity matching system returns a list of candidate entities 314 and a corresponding similarity score for each respective candidate entity in the list of candidate entities, as described in FIG. 3, the entity matching system is configured to route the list of candidate entities 314 to router 416. Router 416 is configured to analyze the list of candidate entities 314 and determine whether a predicted entity of the list of candidate entities matches the entity in the user request, for example, output

418A ("Match"), whether the entity matching system needs to employ further processing to provide an output to the user, for example, output 418B ("Further LLM Processing"), or whether no candidate entity of the list of candidate entities matches the entity in the user request, for example, output 418C ("No Match").

In some aspects, the entity matching system accesses a minimum similarity score threshold 419B and maximum similarity score threshold 419A to make a determination for whether a network contact matches a new local contact. In some instances, router 416 generates output 418A ("No Match") when no candidate entity of the list of candidate entities 314 has a corresponding similarity score that at least meets the minimum similarity score threshold 419B. For example, if the minimum similarity score threshold is 0.85, then none of the candidate entities 314A-314F would have a corresponding similarity score that exceeds the minimum similarity score threshold 419B. Accordingly, router 416 determines that no match was found and generates output 418C. When no match is found, the entity matching system will proceed with creating the new local contact for the entity indicated in the user request and save the local contact in the user's contact base, as described in FIG. 2.

In some instances, router 416 generates output 418A ("Match") when at least one or exactly one candidate entity of the list of candidate entities has a corresponding similarity score that exceeds the maximum similarity score threshold 419A and generates output 418A ("Match"). For example, if the maximum similarity score threshold 419A is 0.8, then candidate entity 314A of the list of candidate entities 314 has a similarity score (0.83) that exceeds the maximum similarity score threshold 419A. Accordingly, router 416 determines that a match was found and generates output 418A. When a match is found, the entity matching system will prompt the user to connect to the network contact associated with candidate entity 314A, also described in FIG. 2. In the case when two or more candidate entities of the list of candidate entities each has a corresponding similarity score that exceeds the maximum similarity score threshold, the entity matching system may prompt the user to select between the two or more candidate entities for connecting or may provide the two or more candidate entities to the second LM for further processing, described in more detail below, to output one of the two or more candidates that best matches the entity in the user request.

In some instances, router 416 generates output 418B ("Further LM Processing") when one or more candidate entities of the list of candidate entities has a corresponding similarity score that falls between the minimum similarity score threshold 419B and the maximum similarity score threshold 419A. For example, if the minimum similarity score threshold is 0.4 and the maximum similarity score threshold is 0.9, then candidate entity 314A, candidate entity 314D, and candidate entity 314F each has a corresponding similarity score that falls between the minimum similarity score threshold 419B and maximum similarity score threshold 419A. In some aspects, the minimum similarity score threshold 419B is 0.8 and the maximum similarity score threshold 419A is 0.95.

Accordingly, router 416 determines that further LM processing is needed to determine if there is a match or not and generates output 418B. When a match is inconclusive, the entity matching system will further process the list of candidate entities 314 using a second language model 406 to determine which of the list of candidate entities 314 is a match or, alternatively, that the entity in the user request does not match any of the candidate entities in the list of candidate entities 314.

In particular, the entity matching system routes the list of candidate entities 314, the encoded network contact information 304, and encoded entity information 310 to prompt builder 420. Prompt builder 420 is a component that generates prompts for machine learning models, such as language models, which can be used to prompt the language model to perform various tasks. Prompt builder 420 is configured to generate instructions for the language model to complete one or more tasks and structure one or more inputs as context for performing those tasks. In particular, prompt builder 420 is configured to generate prompt 422. Prompt 422 instructs a second language model 406 to output either a predicted entity if a candidate entity of the list of candidate entities 314 is predicted to match the entity indicated in the user request, or a determination that the no candidate entity is predicted to match the entity indicated in the user request.

In some aspects, the prompt comprises at least two instances of natural language instructions to output a determination that no candidate entity is predicted to match the entity in the user request if the language model determines that no match exists. By prompting the language model to perform entity matching, the output of the language model may be skewed toward finding a match or hallucinating a match, even if a match does not exist. Thus, by providing the instructions twice in the same prompt to output that no match is found, the accuracy of the language model outputting a no match output when no match exists is increased. An example of prompt 422 is provided below:

"You are a meticulous data analyst charged with the responsibility of accurately pairing contacts with the most suitable companies by evaluating detailed profiles. Accuracy is crucial; therefore, only provide matches you are confident about. The response should be either one of the Company IDs from the list or −1 if there is any uncertainty.<|eot_id|><|start_header_id|>user<|end_header_id|>\n\n ###Task ###Evaluate and pair the given contact with the best-suited company from the provided list. Emphasize that a suitable match may not always be available; in such cases, return −1. \n
Contact info: Name(s): {contact_name}; Email(s): {contact_email}; Address(s):; Postal code(s):; State(s):; Phone(s): \n
Company id: {company_id} company info: {cmpany_indo}
Company id: {company_id} company info: {cmpany_indo}
Output ###\n Return the Company ID of the most fitting company based on the comparative analysis of the profiles. Should there be no appropriate matches, the response should be strictly −1. Accuracy is paramount in this task; the model should only return a Company ID if it is highly confident in the match. If there is any uncertainty, it must return −1 to ensure the precision of the results. No explanations or additional text should be included.<|eot_id|><|start_header_id|> assistant<|end_header_id|>\n\n After prompt 422 is generated, the entity matching system then provides prompt 422 to the second language model 406 and receives, from the second language model 406, a generated response 424 comprising a predicted entity, such as in output 426B ("Match") or a determination that no match was found, such as in output 426A ("No Match"). In some aspects, the second language model 406 compares the encoded network contact information 304 corresponding to the entity and any corresponding details with the encoded network contact information for each of the candidate entities of the list of candidate entities 314. Beneficially, in some aspects, second language model 406 is configured as an LLM in order to leverage the more robust capabilities associated with large language models. Further, by only engaging the LLM when the entity matching system determines that the initial results provided by the SLM (e.g., language model 306) are indeterminate the entity matching system efficiently manages computational resources by limiting calls to the LLM.

Beneficially, the hybrid approach associated with entity matching systems described herein achieves significant improvement in match identification, increasing the number of matches by approximately 60%. This methodology also enhances overall computational efficiency, as the LLM is only deployed selectively to a subset of the candidate matches through the routing mechanism provided by router 416. Additionally, cases routed to the LLM typically only require a single prompt to the LLM based on using the custom prompt engineering associated with prompt 422. Because prompt 422 comprises both the information for the entity indicated in the user query and information for each candidate entity of the list of candidate entities comprising k number of candidate entities, language model 306 is able to analyze k number of comparisons based on a single prompt, instead of multiple calls of one-to-one comparisons between the entity indicated in the user query and each candidate entity separately.

In some aspects, the entity matching system performs one or more verification check(s) 430 to verify generated response 424 from the second language model 406. In some aspects, the entity matching system verifies that the predicted entity matches at least one candidate entity in the list of candidate entities 314. Additionally, or alternatively, the entity matching system verifies that the predicted entity indicated in generated response 424 matches at least one network contact in the database of network contacts prior to generating and displaying the user recommendation to connect to the network contact. While the LLM is instructed, via prompt 422, to only pick from the list of candidate entities 314, the LLM may hallucinate a predicted entity in its output. Thus, these additional verification checks help to further improve the identification of entity matches, including ensuring that the LLM has not produced a hallucinated entity match.

Example Method for Entity Matching

FIG. 5 depicts an example method 500 for performing entity matching. In one aspect, method 500 can be implemented by system 100 of FIG. 1 and/or processing system 600 of FIG. 6.

Figure 6:
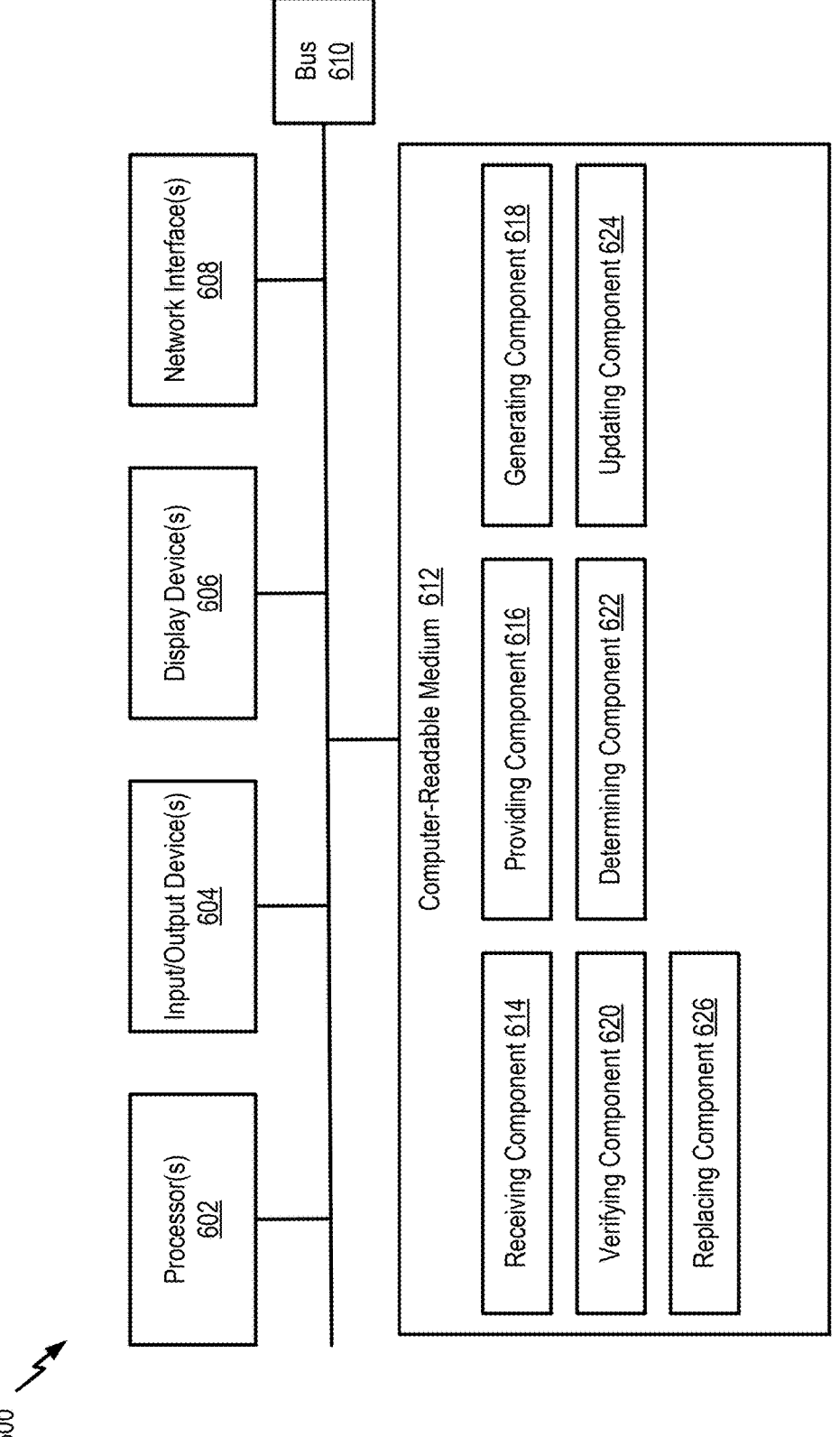
FIG. 6 depicts an example processing system with which aspects of the present disclosure can be performed.

Method 500 starts at block 505 with receiving a user request from a first user to create a local contact for an entity. In some aspects, receiving component 614 of FIG. 6 is configured to receive user request 308 of FIG. 3 from a user to create a local contact for entity 309 of FIG. 3.

Method 500 continues to block 510 with providing the user request to a first language model configured to access a database of network contacts. In some aspects, providing component 616 of FIG. 6 is configured to provide user request 308 of FIG. 3 to language model 306 of FIG. 3, which is configured to access database of network contacts 302 of FIG. 3.

Method 500 continues to block 515 with receiving a list of candidate entities from the first language model, the list of candidate entities comprising one or more network contacts from the database of network contacts that are predicted to match the entity indicated in the user request and a corresponding similarity score for each respective candidate entity in the list of candidate entities, wherein the corresponding similarity score represents a similarity between the entity indicated in the user request and a respective candidate entity. In some aspects, receiving component 614 of FIG. 6 is configured to receive a list of candidate entities 314 of FIG. 3 from language model 306 of FIG. 3 that comprise one or more network contacts from database of network contacts 302 of FIG. 3 that are predicted to match entity 309 of FIG. 3.

In some aspects, in response to determining that a similarity score for at least one candidate entity falls between a minimum similarity score threshold and a maximum similarity score threshold, the method 500 proceeds to blocks 520-540. In some aspects, determining component 622 of FIG. 6 is configured to determine that the similarity score for at least one candidate entity from the list of candidate entities 314 of FIG. 3 falls between minimum similarity score threshold 419B of FIG. 4 and maximum similarity score threshold 419A of FIG. 4, wherein the router 416 of FIG. 4 generates output 418B of FIG. 4 and proceeds to further LM processing.

In particular, method 500 continues to block 520 with generating a prompt instructing a second language model to output a predicted entity if a candidate entity of the list of candidate entities is predicted to match the entity indicated in the user request or output a determination that no candidate entity is predicted to match the entity indicated in the user request. In some aspects, generating component 618 of FIG. 6 is configured to generate prompt 422 of FIG. 4 that instructs second language model 406 of FIG. 4 to output a predicted entity if a candidate entity of the list of candidate entities 314 of FIG. 3 is predicted to match entity 309 of FIG. 3, such as output 426B of FIG. 4 ("Match"), or output a determination that no candidate entity is predicted to match entity 309 of FIG. 3 indicated in user request 308 of FIG. 3.

Method 500 continues to block 525 with providing the user request, the list of candidate entities, and the prompt to a second language model. In some aspects, providing component 616 of FIG. 6 is configured to provide user request 308 of FIG. 3 (and/or encoded entity information 310 of FIG. 3), list of candidate entities 314 of FIG. 3 (and/or encoded network contact information 304 of FIG. 3), and prompt 422 of FIG. 4 to language model 406 of FIG. 4.

Method 500 continues to block 530 with receiving a response from the second language model comprising a predicted entity. In some aspects, receiving component 614 of FIG. 6 is configured to receive generated response 424 of FIG. 4 from language model 406 of FIG. 4 comprising a predicted entity, such as in output 426B of FIG. 4 ("Match: Entity 314A").

Method 500 continues to block 535 with verifying that the predicted entity matches at least one candidate entity of the list of candidate entities received from the first language model. In some aspects, verifying component 620 of FIG. 6 is configured to verify that candidate entity 314A of FIG. 3 matches at least one candidate entity of the list of candidate entities 314 of FIG. 3 received from language model 306 of FIG. 3.

Method 500 continues to block 540 with generating for display a user recommendation to replace the local contact of the entity indicated in the user request with a network contact corresponding to the predicted entity. In some aspects, generating component 618 of FIG. 6 is configured to generate for display user recommendation, as displayed in window 220 of FIG. 2, to replace the local contact of the indicated in user request 204 of FIG. 2 with a network contact 224 of FIG. 2 corresponding to the predicted entity.

In some aspects, method 500 further includes verifying that the predicted entity matches at least one network contact in the database of network contacts prior to generating and displaying the user recommendation. In some aspects, verifying component 620 of FIG. 6 is configured to verify that the predicted entity matches at least one network contact in the database of network contacts associated with user-selectable option 208 of FIG. 2.

In some aspects, the user request comprising one or more attributes of the entity to be included in the local contact, and the similarity between the entity indicated in the user request and a respective candidate entity is based on a comparison between the one or more attributes of the entity indicated in the user request and one or more attributes corresponding to the respective candidate entity. For example, in some aspects, one or more attributes of the entity to be included in the local contact comprises a name associated with user-selectable option 212 of FIG. 2, email address associated with user-selectable option 214 of FIG. 2, phone number associated with user-selectable option 216 of FIG. 2, and/or postal code associated with user-selectable option 218 of FIG. 2.

In some aspects, the database of network contacts comprises a plurality of embeddings associated with a plurality of network contacts, wherein method 500 further comprises generating an embedding of the user request, and the corresponding similarity score for each candidate entity is determined based on a cosine similarity between the embedding of the user request and an embedding of a respective candidate entity. In some aspects, generating component 618 of FIG. 6 is configured to generate an embedding of user request 308 of FIG. 3, such as encoded entity information 310 of FIG. 3, wherein the corresponding similarity score for each candidate entity of the list of candidate entities 314 of FIG. 3 is determined based on a cosine similarity between encoded entity information 310 of FIG. 3 and an embedding, such as encoded network contact 304A of FIG. 3, of a respective candidate entity, such as network contact 302A of FIG. 3.

In some aspects, method 500 further includes receiving a second user request to create a local contact for an entity. In some aspects, method 500 further includes providing the second user request to the first language model configured to access the database of network contacts. In some aspects, method 500 further includes receiving a second list of candidate entities from the first language model, the list of candidate entities comprising one or more network contacts from the database of network contacts that are predicted to match the entity indicated in the second user request and a corresponding similarity score for each respective candidate entity in the list of candidate entities, wherein the corresponding similarity score represents a similarity between the entity indicated in the second user request and a respective candidate entity.

In some aspects, method 500 further includes determining that a similarity score for at least one candidate entity exceeds a maximum similarity score threshold. In some aspects, determining component 622 of FIG. 6 determines that a similarity score for at least one candidate entity exceeds maximum similarity score threshold 419A of FIG. 4.

In some aspects, method 500 further includes generating for display, in response to determining that the similarity score for at least one candidate entity exceeds the maximum similarity score threshold, a user recommendation to replace the local contact of the entity with a network contact corresponding to the at least one candidate entity. In some aspects, generating component 618 of FIG. 6 is configured to generate for display, a user recommendation, such as displayed in window 220 of FIG. 2, to replace the local contact of the entity indicated in user request 204 of FIG. 2 with network contact 224 of FIG. 2.

In some aspects, method 500 further includes receiving a second user request to create a local contact for an entity. In some aspects, method 500 further includes providing the second user request to the first language model configured to access the database of network contacts. In some aspects, method 500 further includes receiving a second list of candidate entities from the first language model, the list of candidate entities comprising one or more network contacts from the database of network contacts that are predicted to match the entity indicated in the second user request and a corresponding similarity score for each respective candidate entity in the list of candidate entities, wherein the corresponding similarity score represents a similarity between the entity indicated in the second user request and a respective candidate entity.

In some aspects, method 500 further includes determining that a similarity score for at least one candidate entity does not meet a minimum similarity score threshold. In some aspects, determining component 622 of FIG. 6 is configured to determine that a similarity score at least one candidate entity does not meet minimum similarity score threshold 419B of FIG. 4.

In some aspects, method 500 further includes generating for display, in response to determining that the similarity score for at least one candidate entity does not meet the minimum similarity score threshold, a user recommendation to create a new local contact for the entity. In some aspects, generating component 618 of FIG. 6 is configured to generate a user recommendation to create new local contact 226 of FIG. 2 for the entity indicated in user request 204 of FIG. 2.

In some aspects, the prompt comprises at least two instances of natural language instructions to output a determination that no candidate entity is predicted to match the entity indicated in the user request if no candidate entity matches the entity indicated in the user request.

In some aspects, method 500 further includes receiving user input to accept or reject the user recommendation to replace the local contact for the entity with a network contact for a particular candidate entity predicted to match the entity indicated in the user request. In some aspects, method 500 further includes replacing the local contact for the entity with a network contact corresponding to the predicted entity.

In some aspects, method 500 further includes updating one or more parameters of the first language model or second language model based on receiving the user input to accept or reject the user recommendation. In some aspects, updating component 624 of FIG. 6 is configured to update one or more parameters of language model 306 of FIG. 3 and/or language model 406 of FIG. 4.

In some aspects, method 500 further includes receiving user input from a second user responsible for the network contact corresponding to the predicted entity, the user input comprising an update to at least one attribute in the network contact. In some aspects, method 500 further includes automatically updating the network contact with the update to at least one attribute such that the update is visible to the first user.

Accordingly, aspects of method 500 provide technical solutions to technical problems associated with existing systems for code generation. In particular, method 500 addresses the challenge of implementing LLMs in large-scale environments by providing a selective routing mechanism that only engages the use of an LLM when the preliminary results from the SLM are inconclusive. By implementing a hybrid approach to entity matching, method 500 is able to more efficiently manage and utilize computational resources when performing entity matching.

In some aspects, method 500 is able to produce results faster when preliminary results are sufficient, thereby improving the user experience and increasing the likelihood of meeting SLA requirements. Further, results can be obtained faster because the LLM also leverages outputs provided by the SLM, including the list of candidate entities and corresponding similarity scores, thereby reducing the processing, and corresponding time, needed for the LLM to perform the entity matching task. Method 500 also achieves additional benefits over currently available entity matching systems by employing additional verification checks to mitigate the possibility of the LLM producing hallucinated matches. Overall, method 500 provides improved entity matching systems that achieve improved computational resource management, as well as improved user experience associated with the entity matching results.

Note that FIG. 5 is just one example of a method, and other methods including fewer, additional, or alternative operations are possible consistent with this disclosure.

Example Processing System for Entity Matching

FIG. 6 depicts an example processing system 600 configured to perform various aspects described herein, including, for example, method 500 as described above with respect to FIG. 5.

Processing system 600 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 600 includes one or more processor(s) 602, one or more input/output device(s) 604, one or more display device(s) 606, one or more network interface(s) 608 through which the processing system 600 is connected to one or more networks (e.g., a local network, an intranet, the Internet, or any other group of processing systems communicatively connected to each other), and computer-readable medium 612. In the depicted example, the aforementioned components are coupled by a bus 610, which may generally be configured for data exchange amongst the components. Bus 610 may be representative of multiple buses, while only one is depicted for simplicity.

Processor(s) 602 are generally configured to retrieve and execute instructions stored in one or more memories, including local memories like computer-readable medium 612, as well as remote memories and data stores. Similarly, processor(s) 602 are configured to store application data residing in local memories like the computer-readable medium 612, as well as remote memories and data stores. More generally, bus 610 is configured to transmit programming instructions and application data among the processor(s) 602, display device(s) 606, network interface(s) 608, and/or computer-readable medium 612. In certain aspects processor(s) 602 are representative of one or more central processing units (CPUs), graphics processing unit (GPUs), tensor processing unit (TPUs), accelerators, and other processing devices.

Input/output device(s) 604 may include any device, mechanism, system, interactive display, and/or various other hardware and software components for communicating information between processing system 600 and a user of processing system 600. For example, input/output device(s) 604 may include input hardware, such as a keyboard, touch screen, button, microphone, speaker, and/or other device for receiving inputs from the user and sending outputs to the user.

Display device(s) 606 may generally include any sort of device configured to display data, information, graphics, user interface elements, and the like to a user. For example, display device(s) 606 may include internal and external displays such as an internal display of a tablet computer or an external display for a server computer or a projector. Display device(s) 606 may further include displays for devices, such as augmented, virtual, and/or extended reality devices. In various aspects, display device(s) 606 may be configured to display a graphical user interface.

Network interface(s) 608 provides processing system 600 with access to external networks and thereby to external processing systems. Network interface(s) 608 can generally be any hardware and/or software capable of transmitting and/or receiving data via a wired or wireless network connection. Accordingly, network interface(s) 608 can include a communication transceiver for sending and/or receiving any wired and/or wireless communication.

Computer-readable medium 612 may be a volatile memory, such as a random-access memory (RAM), or a nonvolatile memory, such as nonvolatile random-access memory (NVRAM), or the like. In this example, computer-readable medium 612 includes receiving component 614, providing component 616, generating component 618, verifying component 620, determining component 622, updating component 624, and replacing component 626. Processing of the components 614-626 may enable and cause the processing system 600 to perform the method 500 described with respect to FIG. 5, or any aspect related to it.

For instance, in certain aspects, receiving component 614 is configured to receive a user request from a first user to create a local contact for an entity. In certain aspects, providing component 616 is configured to provide the user request to a first language model configured to access a database of network contacts. In certain aspects, receiving component 614 is configured to receive a list of candidate entities from the first language model, the list of candidate entities comprising one or more network contacts from the database of network contacts that are predicted to match the entity indicated in the user request and a corresponding similarity score for each respective candidate entity in the list of candidate entities, wherein the corresponding similarity score represents a similarity between the entity indicated in the user request and a respective candidate entity.

In certain aspects, generating component 618 is configured to generate a prompt instructing a second language model to output a predicted entity if a candidate entity of the list of candidate entities is predicted to match the entity indicated in the user request or output a determination that no candidate entity is predicted to match the entity indicated in the user request. In certain aspects, providing component 616 is configured to provide the user request, the list of candidate entities, and the prompt to a second language model. In certain aspects, receiving component 614 is configured to receive a response from the second language model comprising a predicted entity. In certain aspects, verifying component 620 is configured to verify that the predicted entity matches at least one candidate entity of the list of candidate entities received from the first language model. In certain aspects, generating component 618 is configured to generate for display a user recommendation to replace the local contact of the entity indicated in the user request with a network contact corresponding to the predicted entity.

Note that FIG. 6 is just one example of a processing system consistent with aspects described herein, and other processing systems having additional, alternative, or fewer components are possible consistent with this disclosure.

Example Clauses

Implementation examples are described in the following numbered clauses:

Clause 1: A method, comprising: receiving a user request from a first user to create a local contact for an entity; providing the user request to a first language model configured to access a database of network contacts; receiving a list of candidate entities from the first language model, the list of candidate entities comprising one or more network contacts from the database of network contacts that are predicted to match the entity indicated in the user request and a corresponding similarity score for each respective candidate entity in the list of candidate entities, wherein the corresponding similarity score represents a similarity between the entity indicated in the user request and a respective candidate entity; and in response to determining that a similarity score for at least one candidate entity falls between a minimum similarity score threshold and a maximum similarity score threshold: generating a prompt instructing a second language model to output a predicted entity if a candidate entity of the list of candidate entities is predicted to match the entity indicated in the user request or output a determination that no candidate entity is predicted to match the entity indicated in the user request; providing the user request, the list of candidate entities, and the prompt to a second language model; receiving a response from the second language model comprising a predicted entity; verifying that the predicted entity matches at least one candidate entity of the list of candidate entities received from the first language model; and generating for display a user recommendation to replace the local contact of the entity indicated in the user request with a network contact corresponding to the predicted entity.

Clause 2: The method of Clause 1, further comprising verifying that the predicted entity matches at least one network contact in the database of network contacts prior to generating and displaying the user recommendation.

Clause 3: The method of any one of Clauses 1-2, wherein: the user request comprising one or more attributes of the entity to be included in the local contact, and the similarity between the entity indicated in the user request and a respective candidate entity is based on a comparison between the one or more attributes of the entity indicated in the user request and one or more attributes corresponding to the respective candidate entity.

Clause 4: The method of any one of Clauses 1-3, wherein: the database of network contacts comprises a plurality of embeddings associated with a plurality of network contacts, the method further comprises generating an embedding of the user request, and the corresponding similarity score for each candidate entity is determined based on a cosine similarity between the embedding of the user request and an embedding of a respective candidate entity.

Clause 5: The method of any one of Clauses 1-4, further comprising: receiving a second user request to create a local contact for an entity; providing the second user request to the first language model configured to access to the database of network contacts; receiving a second list of candidate entities from the first language model, the list of candidate entities comprising one or more network contacts from the database of network contacts that are predicted to match the entity indicated in the second user request and a corresponding similarity score for each respective candidate entity in the list of candidate entities, wherein the corresponding similarity score represents a similarity between the entity indicated in the second user request and a respective candidate entity; determining that a similarity score for at least one candidate entity exceeds a minimum similarity score threshold; and generating for display, in response to determining that the similarity score for at least one candidate entity exceeds the minimum similarity score threshold, a user recommendation to replace the local contact of the entity with a network contact corresponding to the at least one candidate entity.

Clause 6: The method of any one of Clauses 1-5, further comprising: receiving a second user request to create a local contact for an entity; providing the second user request to the first language model configured to access to the database of network contacts; receiving a second list of candidate entities from the first language model, the list of candidate entities comprising one or more network contacts from the database of network contacts that are predicted to match the entity indicated in the second user request and a corresponding similarity score for each respective candidate entity in the list of candidate entities, wherein the corresponding similarity score represents a similarity between the entity indicated in the second user request and a respective candidate entity; determining that a similarity score for at least one candidate entity does not meet a minimum similarity score threshold; and generating for display, in response to determining that the similarity score for at least one candidate entity does not meet the minimum similarity score threshold, a user recommendation to create a new local contact for the entity.

Clause 7: The method of any one of Clauses 1-6, wherein the prompt comprises at least two instances of natural language instructions to output a determination that no candidate entity is predicted to match the entity indicated in the user request if no candidate entity matches the entity indicated in the user request.

Clause 8: The method of any one of Clauses 1-7, further comprising receiving user input to accept or reject the user recommendation to replace the local contact for the entity with a network contact for a particular candidate entity predicted to match the entity indicated in the user request.

Clause 9: The method of Clause 8, further comprising updating one or more parameters of the first language model or second language model based on receiving the user input to accept or reject the user recommendation.

Clause 10: The method of any one of Clauses 1-9, further comprising: replacing the local contact for the entity with a network contact corresponding to the predicted entity; receiving user input from a second user responsible for the network contact corresponding to the predicted entity, the user input comprising an update to at least one attribute in the network contact; and automatically updating the network contact with the update to the at least one attribute such that the update is visible to the first user.

Clause 11: A processing system, comprising: memory comprising computer-executable instructions; and one or more processors configured to execute the computer-executable instructions and cause the processing system to perform a method in accordance with any one of Clauses 1-10.

Clause 12: A processing system, comprising means for performing a method in accordance with any one of Clauses 1-10.

Clause 13: A non-transitory computer-readable medium storing program code for causing a processing system to perform the steps of any one of Clauses 1-10.

Clause 14: A computer program product embodied on a computer-readable storage medium comprising code for performing a method in accordance with any one of Clauses 1-10.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented, or a method may be practiced using any number of the aspects set forth herein. In addition, the scope of the disclosure is intended to cover such an apparatus or method that is practiced using other structure, functionality, structure, and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database, or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
receiving a user request from a first user to create a local contact for an entity;
providing the user request to a first language model configured to access a database of network contacts;
receiving (1) a list of candidate entities from the first language model, the list of candidate entities comprising one or more network contacts from the database of network contacts, the one or more network contacts predicted by the first language model to match the entity indicated in the user request and (2) a corresponding similarity score for each respective candidate entity in the list of candidate entities, wherein the corresponding similarity score represents a similarity between the entity indicated in the user request and a respective candidate entity; and
in response to determining that a similarity score for at least one candidate entity falls between a minimum similarity score threshold and a maximum similarity score threshold:
generating a prompt instructing a second language model to:
output a predicted entity if a candidate entity of the list of candidate entities received from the first language model is predicted by the second language model to match the entity indicated in the user request, or
output a determination that no candidate entity is predicted to match the entity indicated in the user request if no candidate entity of the list of candidate entities received from the first language model is predicted by the second language model to match the entity indicated in the user request;
providing the user request, the list of candidate entities, and the prompt to the second language model;
receiving, based on a prediction by the second language model that a candidate entity of the list of candidate entities received from the first language model matches the entity indicated in the user request, a response from the second language model, the response comprising the predicted entity;
verifying that the predicted entity matches at least one candidate entity of the list of candidate entities received from the first language model; and
generating for display a user recommendation to replace the local contact of the entity indicated in the user request with a network contact corresponding to the predicted entity.

2. The method of claim 1, further comprising verifying that the predicted entity matches at least one network contact in the database of network contacts prior to generating and displaying the user recommendation.

3. The method of claim 1, wherein:
the user request comprises one or more attributes of the entity to be included in the local contact, and
the similarity between the entity indicated in the user request and the respective candidate entity is based on a comparison between the one or more attributes of the entity indicated in the user request and one or more attributes corresponding to the respective candidate entity.

4. The method of claim 1, wherein:
the database of network contacts comprises a plurality of embeddings associated with a plurality of network contacts,
the method further comprises generating an embedding of the user request, and
the corresponding similarity score for each candidate entity is determined based on a cosine similarity between the embedding of the user request and an embedding of the respective candidate entity.

5. The method of claim 1, further comprising:
receiving a second user request to create a second local contact for a second entity;
providing the second user request to the first language model configured to access the database of network contacts;
receiving a second list of candidate entities from the first language model, the second list of candidate entities comprising one or more network contacts from the database of network contacts that are predicted to match the second entity indicated in the second user request and a corresponding similarity score for each respective candidate entity in the second list of candidate entities, wherein the corresponding similarity score for each respective candidate entity in the second list of candidate entities represents a similarity between the second entity indicated in the second user request and a respective candidate entity in the second list of candidate entities;
determining that a similarity score for at least one candidate entity in the second list of candidate entities exceeds the minimum similarity score threshold; and
in response to determining that the similarity score for at least one candidate entity in the second list of candidate entities exceeds the minimum similarity score threshold, generating for display a user recommendation to replace the second local contact of the second entity with a network contact corresponding to the at least one candidate entity in the second list of candidates entities.

6. The method of claim 1, further comprising:
receiving a second user request to create a second local contact for a second entity;

providing the second user request to the first language model configured to access the database of network contacts;

receiving a second list of candidate entities from the first language model, the second list of candidate entities comprising one or more network contacts from the database of network contacts that are predicted to match the second entity indicated in the second user request and a corresponding similarity score for each respective candidate entity in the second list of candidate entities, wherein the corresponding similarity score for each respective candidate entity in the second list of candidate entities represents a similarity between the second entity indicated in the second user request and a respective candidate entity in the second list of candidate entities;

determining that a similarity score for at least one candidate entity in the second list of candidate entities does not meet the minimum similarity score threshold; and in response to determining that the similarity score for at least one candidate entity in the second list of candidate entities does not meet the minimum similarity score threshold, generating for display a user recommendation to create a new local contact for the second entity.

7. The method of claim 1, wherein the prompt comprises at least two instances of natural language instructions to output the determination that no candidate entity is predicted to match the entity indicated in the user request if no candidate entity of the list of candidate entities received from the first language model is predicted by the second language model to match the entity indicated in the user request.

8. The method of claim 1, further comprising receiving user input to accept or reject the user recommendation to replace the local contact for the entity indicated in the user request with a network contact for a particular candidate entity predicted to match the entity indicated in the user request.

9. The method of claim 8, further comprising updating one or more parameters of the first language model or the second language model based on receiving the user input to accept or reject the user recommendation.

10. The method of claim 1, further comprising:
replacing the local contact for the entity indicated in the user request with the network contact corresponding to the predicted entity;
receiving user input from a second user responsible for the network contact corresponding to the predicted entity, the user input comprising an update to at least one attribute in the network contact corresponding to the predicted entity; and
automatically updating the network contact corresponding to the predicted entity with the update to the at least one attribute such that the update is visible to the first user.

11. A processing system, comprising: memory comprising computer-executable instructions; and one or more processors configured to execute the computer-executable instructions and cause the processing system to:
receive a user request from a first user to create a local contact for an entity;
provide the user request to a first language model configured to access re-a database of network contacts;
receive (1) a list of candidate entities from the first language model, the list of candidate entities comprising one or more network contacts from the database of network contacts, the one or more network contacts predicted by the first language model to match the entity indicated in the user request and (2) a corresponding similarity score for each respective candidate entity in the list of candidate entities, wherein the corresponding similarity score represents a similarity between the entity indicated in the user request and a respective candidate entity; and in response to determining that a similarity score for at least one candidate entity falls between a minimum similarity score threshold and a maximum similarity score threshold:
generate a prompt instructing a second language model to:
output a predicted entity if a candidate entity of the list of candidate entities received from the first language model is predicted by the second language model to match the entity indicated in the user request, or
output a determination that no candidate entity is predicted to match the entity indicated in the user request if no candidate entity of the list of candidate entities received from the first language model is predicted by the second language model to match the entity indicated in the user request;
provide the user request, the list of candidate entities, and the prompt to the second language model;
receive, based on a prediction by the second language model that a candidate entity of the list of candidate entities received from the first language model matches the entity indicated in the user request, a response from the second language model, the response comprising the predicted entity;
verify that the predicted entity matches at least one candidate entity of the list of candidate entities received from the first language model; and
generate for display a user recommendation to replace the local contact of the entity indicated in the user request with a network contact corresponding to the predicted entity.

12. The processing system of claim 11, wherein the one or more processors are further configured to execute the computer-executable instructions and cause the processing system to verify that the predicted entity matches at least one network contact in the database of network contacts prior to generating and displaying the user recommendation.

13. The processing system of claim 11, wherein:
the user request comprises one or more attributes of the entity to be included in the local contact, and
the similarity between the entity indicated in the user request and the respective candidate entity is based on a comparison between the one or more attributes of the entity indicated in the user request and one or more attributes corresponding to the respective candidate entity.

14. The processing system of claim 11, wherein:
the database of network contacts comprises a plurality of embeddings associated with a plurality of network contacts,
the one or more processors are further configured to execute the computer-executable instructions and cause the processing system to generate an embedding of the user request, and
the corresponding similarity score for each candidate entity is determined based on a cosine similarity between the embedding of the user request and an embedding of the respective candidate entity.

15. The processing system of claim 11, wherein the one or more processors are further configured to execute the computer-executable instructions and cause the processing system to:

receive a second user request to create a second local contact for a second entity;

provide the second user request to the first language model configured to access e the database of network contacts;

receive a second list of candidate entities from the first language model, the second list of candidate entities comprising one or more network contacts from the database of network contacts that are predicted to match the second entity indicated in the second user request and a corresponding similarity score for each respective candidate entity in the second list of candidate entities, wherein the corresponding similarity score for each respective candidate entity in the second list of candidate entities represents a similarity between the second entity indicated in the second user request and a respective candidate entity in the second list of candidate entities;

determine that a similarity score for at least one candidate entity in the second list of candidate entities exceeds the minimum similarity score threshold; and in response to determining that the similarity score for at least one candidate entity in the second list of candidate entities exceeds the minimum similarity score threshold, generate for display a user recommendation to replace the second local contact of the second entity with a network contact corresponding to the at least one candidate entity in the second list of candidate entities.

16. The processing system of claim 11, wherein the one or more processors are further configured to execute the computer-executable instructions and cause the processing system to:

receive a second user request to create a second local contact for a second entity;

provide the second user request to the first language model configured to access to the database of network contacts;

receive a second list of candidate entities from the first language model, the second list of candidate entities comprising one or more network contacts from the database of network contacts that are predicted to match the second entity indicated in the second user request and a corresponding similarity score for each respective candidate entity in the second list of candidate entities, wherein the corresponding similarity score for each respective candidate entity in the second list of candidate entities represents a similarity between the second entity indicated in the second user request and a respective candidate entity in the second list of candidate entities;

determine that a similarity score for at least one candidate entity in the second list of candidate entities does not meet the minimum similarity score threshold; and in response to determining that the similarity score for at least one candidate entity in the second list of candidate entities does not meet the minimum similarity score threshold, generate for display a user recommendation to create a new local contact for the second entity.

17. The processing system of claim 11, wherein the prompt comprises at least two instances of natural language instructions to output the determination that no candidate entity is predicted to match the entity indicated in the user request if no candidate entity of the list of candidate entities received from the first language model is predicted by the second language model to match the entity indicated in the user request.

18. The processing system of claim 11, wherein the one or more processors are further configured to execute the computer-executable instructions and cause the processing system to receive user input to accept or reject the user recommendation to replace the local contact for the entity indicated in the user request with a network contact for a particular candidate entity predicted to match the entity indicated in the user request.

19. The processing system of claim 18, wherein the one or more processors are further configured to execute the computer-executable instructions and cause the processing system to update one or more parameters of the first language model or the second language model based on receiving the user input to accept or reject the user recommendation.

20. The processing system of claim 11, wherein the one or more processors are further configured to execute the computer-executable instructions and cause the processing system to:

replace the local contact for the entity indicated in the user request with the network contact corresponding to the predicted entity;

receive user input from a second user responsible for the network contact corresponding to the predicted entity, the user input comprising an update to at least one attribute in the network contact corresponding to the predicted entity; and automatically update the network contact corresponding to the predicted entity with the update to the at least one attribute such that the update is visible to the first user.

* * * * *